April 29, 1930.  M. J. CRAWFORD  1,756,085
LIQUID MEASURING AND DISPENSING APPARATUS
Filed June 17, 1927   3 Sheets-Sheet 1

INVENTOR
Malcolm James Crawford
BY
Walter A. Knight
ATTORNEY

April 29, 1930. M. J. CRAWFORD 1,756,085
LIQUID MEASURING AND DISPENSING APPARATUS
Filed June 17, 1927 3 Sheets-Sheet 2
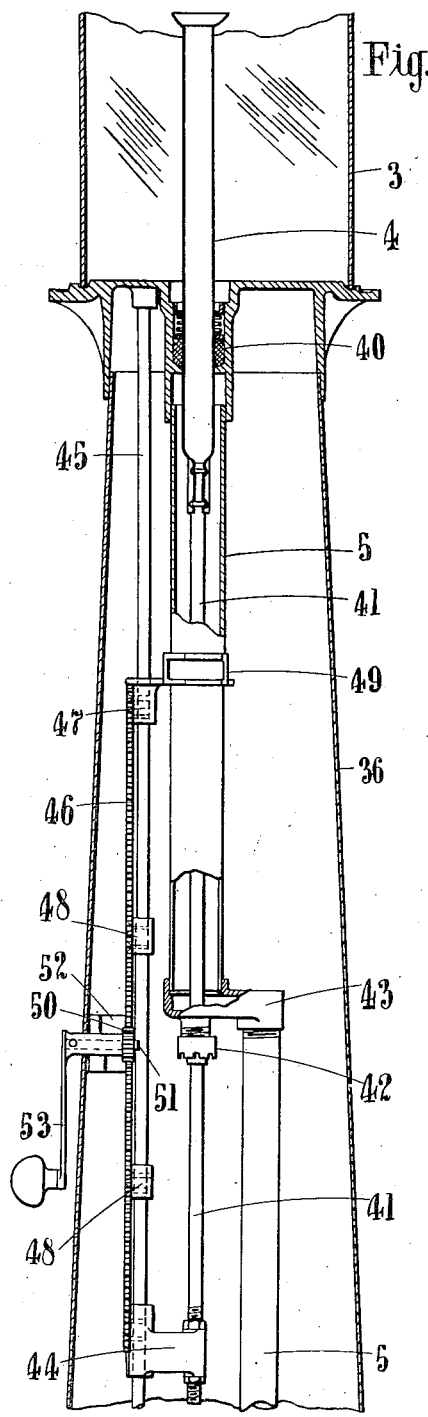
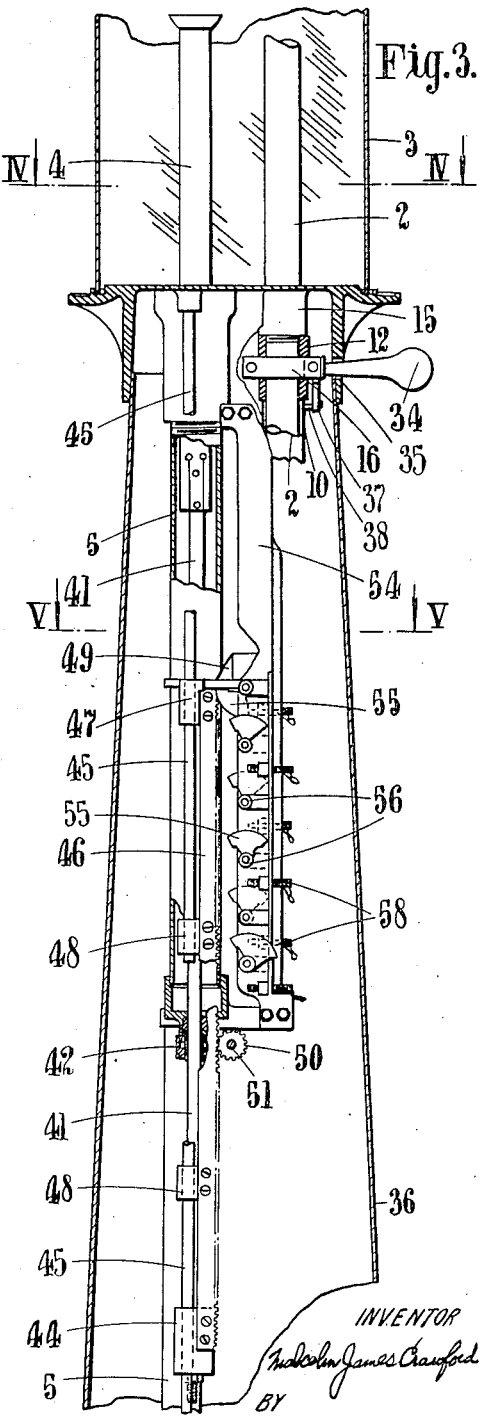
INVENTOR
Malcolm James Crawford
BY
Walter A. Knight
ATTORNEY April 29, 1930.  M. J. CRAWFORD  1,756,085
LIQUID MEASURING AND DISPENSING APPARATUS
Filed June 17, 1927  3 Sheets-Sheet 3
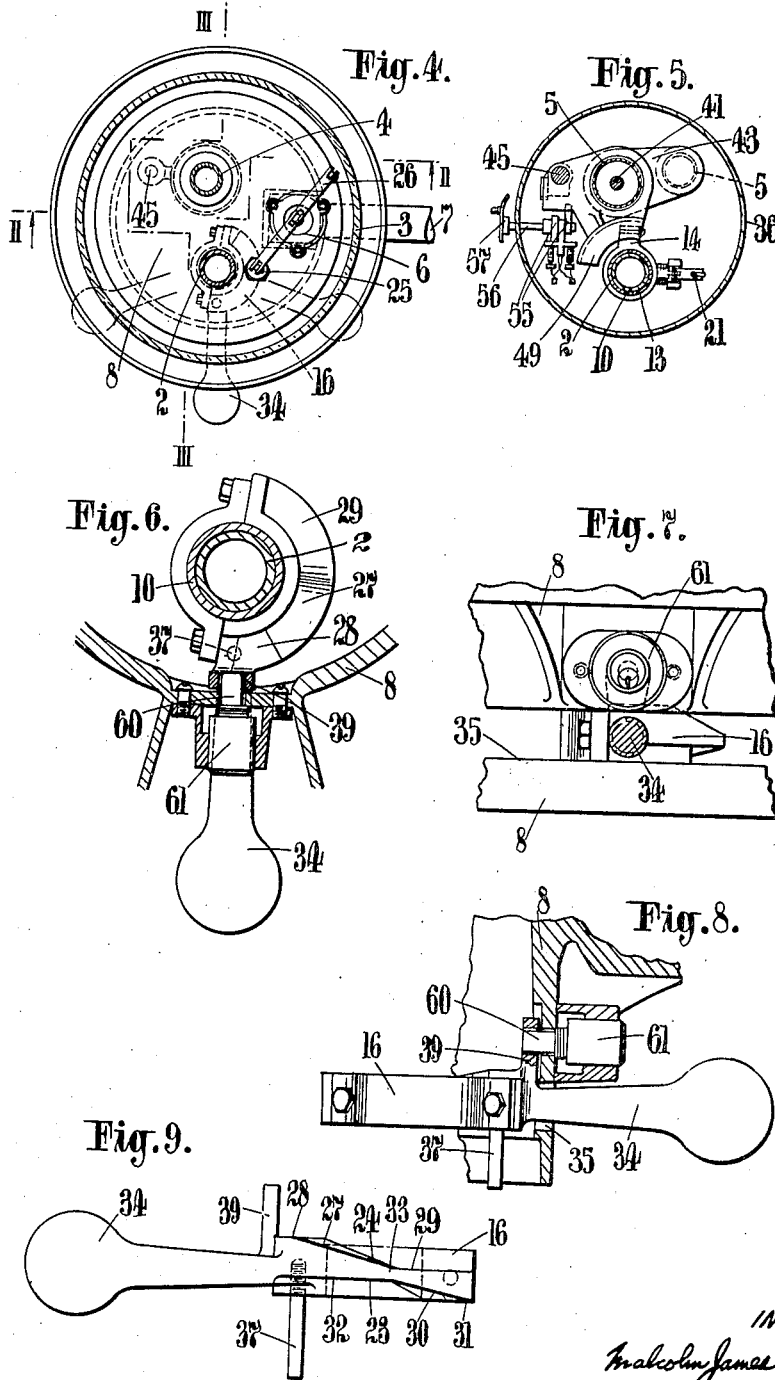

Patented Apr. 29, 1930

1,756,085

UNITED STATES PATENT OFFICE

MALCOLM JAMES CRAWFORD, OF LONDON, ENGLAND, ASSIGNOR TO WAYNE COMPANY, A CORPORATION OF INDIANA

LIQUID MEASURING AND DISPENSING APPARATUS

Application filed June 17, 1927. Serial No. 199,490.

My invention relates to apparatus for dispensing measured quantities of liquid of the kind in which liquid drawn from a reservoir by a suitable pump is delivered into a measuring vessel which it fills to the level of an adjustable gauge tube, surplus liquid overflowing through said tube and returning to the reservoir, the quantity of liquid remaining in the measuring vessel when the pump is stopped being delivered by the opening of a serve valve.

More particularly my invention relates to an apparatus of this kind in which interlocking means is provided to prevent the simultaneous supply of liquid to and delivery from the measuring vessel or any alteration of the gauge setting during such delivery.

The present invention has for an object the provision of a generally improved and simplified construction of apparatus of the kind referred to in which the working parts are few in number and the apparatus as a whole comparatively cheap to manufacture. At the same time the construction is robust and durable while if a renewal of any part should be necessary this can be very readily carried out.

My invention also aims to provide improved means for actuating and interlocking the valves, gauge tube and other working parts in a simple and reliable manner and for reducing or eliminating the possibility of error or fraud in the use of the apparatus.

A further object of my invention is the provision of a liquid measuring and dispensing appliance wherein by the operation of a single operating member the supply of liquid to the measuring vessel is automatically cut off upon opening the serve valve and the means for adjusting the capacity of the measuring vessel is simultaneously locked at a predetermined adjustment.

A further object of my invention is to provide a simple device whereby the inlet and outlet valves and the means for adjusting the capacity of the measuring vessel may be simultaneously locked with both said valves closed.

These and other objects of my invention, the various features of which are more particularly pointed out in the appended claims, will be apparent from the following description with reference to the accompanying drawings showing one embodiment of my invention.

In the drawings:

Fig. 1 is an elevation partly in vertical section illustrating the application of my invention to a known form of measuring and dispensing appliance commonly used for such liquids as gasoline and the like.

Figs. 2 and 3 are further sectional elevations to a somewhat enlarged scale of the apparatus shown in Fig. 1, parts being broken away or omitted for the sake of clearness; the sections correspond substantially to lines II—II and III—III respectively of Fig. 4.

Figs. 4 and 5 are plan views corresponding substantially to sections on lines IV—IV and V—V respectively of Fig. 3.

Figs. 6, 7 and 8 are a plan, front elevation and side elevation respectively, partly in section showing to an enlarged scale portions of the operating member of the apparatus shown in the foregoing figures, together with a locking device therefor, and Fig. 9 is an elevation of the operating member as seen from the opposite side to that shown in Fig. 8.

Figure 1:
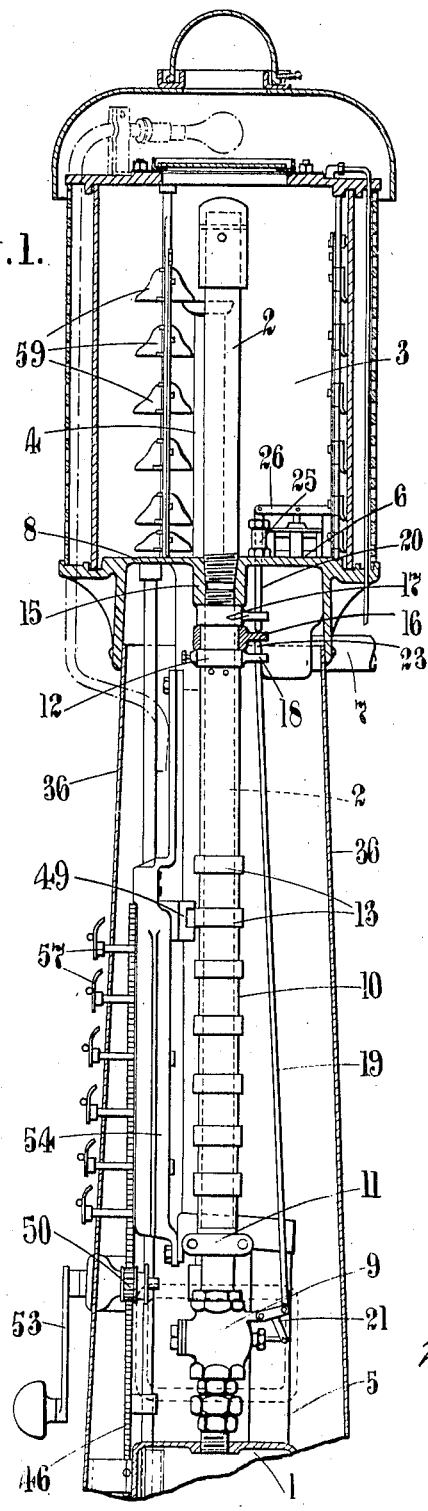

The supply reservoir and pump which usually complete the appliance are conveniently arranged below the apparatus shown in Fig. 1 but are not shown in the drawings as they may be of any construction and are not essentials of the present invention.

In its general construction the apparatus comprises a pump chamber 1, a delivery pipe 2 communicating at its lower end with said pump chamber and at its upper end with the upper part of a glass walled measuring vessel 3, a vertically adjustable gauge tube 4 communicating at its upper end with the measuring vessel 3 and at its lower end with a well pipe 5, and an outlet or "serve" valve 6 obturating an outlet pipe 7 connected to the bottom plate 8 of the measuring vessel 3.

As will be readily appreciated by those familiar with appliances of this kind hitherto in common use, the pump when operated delivers liquid through pump chamber 1 and delivery pipe 2 into the measuring vessel 3 which it fills to the level of the gauge tube 4. Surplus liquid overflows into said gauge tube and returns through well pipe 5 to the reservoir, and the liquid remaining in the measuring chamber when the pump is stopped may be delivered through the outlet pipe 7 by opening serve valve 6. However, in order to insure that liquid cannot be supplied to the vessel 3 and that no adjustment of the gauge tube 4 can occur during such time as the serve valve 6 is open, as well as to prevent the opening of said serve valve if the gauge tube is not set in a predetermined position, I provide according to the invention interlocking means constructed and adapted to operate as will be more fully appreciated from the following description.

A check valve 9 serving as an inlet valve for the measuring vessel 3 is provided in the pump delivery pipe 2 and a sleeve 10 is rotatably mounted on said delivery pipe between a bottom bracket 11 and a top bearing member 12 secured to said delivery pipe. The sleeve 10 terminates at the top just below the top bearing member 12. The cam plate 16 is mounted in a circumferential slot (see Fig. 8). The sleeve 10 carries a number of collars 13 adjustably clamped at intervals thereon, each said collar having a projecting dog 14 (Fig. 5) and all of said dogs being in vertical alignment. Upon the bearing member 12 secured to the delivery pipe 2, which latter is screwed into a boss 15 in the bottom plate 8, is journalled a cylindrical form of cam plate 16. The bearing member 12 has two projections 17, 18 provided with orifices through which pass valve rods 19, 20 respectively so as to be guided thereby. One of the valve rods 19 is articulated at its lower end to a crank member 21 controlling the operation of check valve 9 which constantly tends to close under spring pressure, and at its upper end is associated with a cam surface 23 on the underside of cam plate 16. The other valve rod 20 bears at one end on a cam surface 24 on the upper side of the cam plate 16 and at the other end extends through a gland 25 in the bottom plate 8 and pivotally engages the operating lever 26 of the serve valve 6. The latter in the form shown is of the plain disk type normally maintained closed by spring pressure against which it is lifted by lever 26 when the valve rod 20 is raised.

As shown more clearly in Figs. 6 to 9 the upper surface 24 of the cam plate 16 comprises a helical portion 27 terminating at each end in upper and lower plane portions 28, 29 respectively, while the lower surface 23 of the cam plate is similarly shaped with a helical portion 30 and plane portions 31, 32. The arrangement of the respective surfaces is such that the helices 27, 30 extend in opposite directions around the cam plate 16, the plate being thinnest at the part 33 where the helices rise from the body of the plate. A handle 34 is provided integral with the cam plate 16 and extends through a slot 35 (Figs. 3, 7 and 8) in the side of bottom plate 8 of the vessel 3 for the purpose of manual operation. The angular movement of the cam plate 16 is limited by the length of the slot 35. The cam plate also carries a depending pin 37 which projects between the arms of a fork 38 integral with the sleeve 10 so that the latter moves in unison with cam plate 16. The cam plate also has an integral forked lug 39 (see Figs. 6, 8 and 9) extending vertically at the juncture of the handle portion 34, whereby the apparatus may be locked in an inoperative condition as hereinafter more fully described.

As shown more clearly in Figs. 2 and 3, the gauge tube 4, which is vertically slidable in a gland 40 in bottom plate 8, communicates with the interior of the well pipe 5 and has secured thereto a rod 41 slidable in a gland 42 provided at a cranked portion 43 of the well pipe 5. The lower end of rod 41 is secured in a crosshead 44 slidably mounted on a rigid vertical guide rod 45. The crosshead 44 has also attached thereto a vertical rack bar 46 having at its upper end a bracket 47 of peculiar form as shown more clearly by Figs. 2 and 5 slidably engaging the guide rod 45 and the exterior of the well pipe 5, whereby the rack bar 46 is prevented from rotation about the guide rod 45. Other brackets 48 serve to strengthen the sliding connection of the rack bar 46 and guide rod 45. The bracket 47 is formed with a channel-shaped fork 49, the width of which is such as will afford a sliding fit with the dogs 14 of collars 13 as hereinafter described. A pinion 50 carried by a spindle 51 journalled in a bracket 52 secured to the casing 36, meshes with the teeth of rack bar 46, and upon the end of said spindle outside the casing is mounted a crank handle 53 by rotation of which the rack bar may be raised or lowered. Normally the combined weight of the gauge tube 4, rod 41 and rack bar 46 is sufficient to cause them to descend under their own weight upon release of the handle 53 when they are in a raised position.

Adjacent the rack bar 46 is disposed an abutment plate 54 supported from the casing wall 36. The abutment plate 54 is of T-shaped cross section and carries a number of quadrant-shaped stops 55 rigidly secured on pins 56, journalled in the web portion of said abutment plate, the end of said pins 56 being extended through the casing 36 and carrying indicating buttons 57 (Fig. 1) which are visible and may be turned to rotate the quadrants 55 from the exterior of the casing 36. The quadrant stops 55 are disposed alternatively on opposite sides of the web portion of the abutment plate 54 and are so arranged that when turned into the vertical position in which one corner thereof rests against the flange of the abutment plate 54, they do not extend within reach of the bracket 47, but when turned into the other extreme position in which one radial side of the quadrant is horizontal, as illustrated by the uppermost quadrant shown in Fig. 3, they extend into the path of bracket 47 and thereby limit the downward movement of the rack bar 46 and hence of the gauge tube 4 connected thereto. In the latter position the vertical side of the quadrant rests against a screw 58 which permits of fine adjustment of the limiting position of the quadrant.

In using the apparatus the quadrant stops 55 are adjusted so that at each of the positions of the rack bar 46 when the bracket 47 rests upon a stop 55 the gauge pipe 4 is set to the exact height at which the measuring cylinder when filled to the level of said gauge tube 4 contains precisely a standard quantity of liquid for delivery, e. g. a certain number of gallons or half-gallons. In the example illustrated the gauge tube 4 is adapted to be set at the ½, 1, 2, 3, 4 and 5 gallons capacity of the measuring vessel, and these quantities are indicated against the buttons 57 appertaining to the quadrant stops determining the setting of the gauge tube for the corresponding quantity. Level indicators 59 are also secured at appropriate heights in the measuring vessel 3 and serve as a visible check on the correct operation of the apparatus.

The operation of the appliance is as follows:—

Let it be assumed that the serve handle 34 occupies an extreme position at the left-hand end of the slot 35 (as indicated by broken lines in Fig. 4), in which position the serve valve 6 is closed, the check valve 9 open and the gauge tube is free to slide vertically.

In order now to serve a certain quantity of liquid, for example four gallons, the gauge operating handle 53 is first turned to raise the rack bar 46 and therewith the gauge tube 4 to the top of its stroke, whereupon the button 57 corresponding to four gallons is turned to bring the corresponding quadrant stop 55 into operative position and the handle 53 is released. The rack bar 46 and gauge tube 4 thereupon descend until the bracket 47 meets the operative quadrant stop, whereby further descent thereof is arrested, the gauge tube 4 being thus located in the correct position to limit the capacity of the measuring vessel 3 to four gallons. Liquid is pumped into the measuring vessel through the check valve 9 and pipe 2 until the latter is filled to the top of the gauge tube, surplus liquid overflowing into the gauge tube and passing therethrough to the well pipe 5. Pumping is thereupon ceased and the serve handle is moved from its position at one end of the slot 37 towards the other end thereof. By this movement of the serve handle the sleeve 10 is rotated bringing the dogs 14 into vertical alignment with the fork 49 of the bracket 47, the dog 14 opposite said fork being forced into the channel-shaped portion thereof and thereby locking the rack bar 46 and gauge tube 4 attached thereto against vertical movement. At the same time the movement of the cam plate 16 permits the valve rod 19 to move upwardly as its end passes over the lower helical surface 30 of the cam plate 16 allowing the check valve 9 to be closed by its spring, further movement of the serve handle 34 into its right hand extreme position (see Fig. 4) causing the valve rod 20 to be lifted by the upper helical surface 27 of the cam plate so as to open the serve valve 6 and allow the measured quantity of liquid in the vessel 3 to be delivered through the outlet pipe 7. It will be noted that in the medial position of the serve handle 34, both valve rods 19, 20 contact with the cam plate adjacent the point 33, i. e. both check valve 9 and serve valve 6 are closed, and the appropriate dog 14 has just entered between the sides of fork 49 (see Fig. 5).

The collars 13 on the sleeve 10 are adjusted before the apparatus is put into service so that their dogs exactly engage the fork 49 of the bracket 47 when the latter is located in position engaging a quadrant stop 55, and as the space between said collars is less than the outside dimension of the fork 49 the dogs 14 will foul the fork 49 at all other positions thereof. It is therefore impossible to turn the sleeve member and hence to move the serve handle to open the outlet valve 6 unless the dogs 14 can enter the fork 49, i. e. the apparatus cannot be operated to deliver liquid unless the gauge tube is positively locked at a gauge position. Moreover the arrangement of the cam surfaces on the cam plate 16 insures that the serve valve 6 cannot be opened unless the check valve 9 has previously closed, or in other words it is impossible to pump liquid into the measuring chamber while the serve valve is open.

I also provide means for locking the serve handle 34 in an inoperative position, as illustrated more particularly in Figs. 6, 7 and 8, such means comprising a well known type of lock having a bolt 60 adapted to be advanced from or retracted within a casing 61 by means of a key of any convenient design. The casing 61 is secured to the bottom plate 8 of the apparatus above the middle of the slot 35, through which the serve handle projects. In this position the upstanding lug 39 integral with the serve handle and cam plate 34, 16 is adapted to register with the bolt 60 when the handle 34 is in its middle position, i. e. in the position shown by full lines in Fig. 4. In this position of the serve handle, as stated above both the serve valve 6 and the check valve 9 are closed. At the same time the rack bar 46 and therewith the gauge tube 4 is locked by the engagement of a dog 14 with the fork 49. Thus with this arrangement it is possible by a single locking movement to lock the apparatus completely in such a manner as to prevent operation of any part thereof.

While I have shown my invention in a preferred form it will be obvious to those skilled in the art that it is not so limited, but is susceptible of various changes and modifications without departing from the scope or spirit thereof, and I desire, therefore that only such limitations shall be placed thereupon as are imposed by the prior art or as are specifically set forth in the appended claims.

I claim as my invention:—

1. In a liquid measuring and dispensing apparatus, a measuring vessel, self closing inlet and serve valves therefor, a gland in the bottom of said vessel, a gauge tube vertically slidable in said gland and communicating at its upper end with the interior of the measuring vessel and at its lower end with a well pipe disposed therebeneath, a fork member connected with said gauge tube, a gauge locking member rotatable about a vertical axis disposed adjacent said fork, dogs on said locking member adapted to engage said fork upon rotation of said locking member when one of said dogs is in horizontal alignment with said fork, but to prevent rotation of the locking member in all other positions, a cam plate rotatable co-axially with and connected to said locking member and means for operatively connecting said cam plate with the inlet and serve valves.

2. In a liquid measuring and dispensing apparatus, a measuring vessel, self closing inlet and serve valves therefor, a gland in the bottom of said vessel, a gauge tube vertically slidable in said gland and communicating at its upper end with the interior of the measuring vessel and at its lower end with a well pipe disposed therebeneath, a rack connected to said gauge tube, a pinion engaging said rack, a fork member connected to said rack, a gauge locking member rotatable about a vertical axis disposed adjacent said fork, dogs on said locking member adapted to engage said fork upon rotation of said locking member when one of said dogs is in horizontal alignment with said fork, but to prevent rotation of the locking member in all other positions, a cam plate rotatable co-axially with and connected to said locking member and means for operatively connecting said cam plate with the inlet and serve valves.

3. In a liquid measuring and dispensing apparatus, a measuring vessel, self closing inlet and serve valves therefor, a gland in the bottom of said vessel, a gauge tube vertically slidable in said gland and communicating at its upper end with the interior of the measuring vessel and at its lower end with a well pipe disposed therebeneath, a gauge locking member rotatable about a vertical axis disposed adjacent said gauge tube, dogs on said locking member, means secured to said gauge tube adapted to engage said dogs upon rotation of the locking member when one of said dogs is in a predetermined position with respect thereto, but to prevent rotation of the locking member in all other positions, an abutment device comprising a series of stops each movable into vertical alignment with an abutment bracket carried by said rack, a cam plate rotatable co-axially with and connected to said locking member and means for operatively connecting said cam plate with the inlet and serve valves.

4. In a liquid measuring and dispensing apparatus, a measuring vessel, self-closing inlet and serve valves therefor, a gland in the bottom of said vessel, a gauge tube vertically slidable in said gland and communicating at its upper end with the interior of the measuring vessel and at its lower end with a well pipe disposed therebeneath, a rack mounted on vertical guides and connected to said gauge tube, a pinion engaging said rack, a gauge locating device comprising a plurality of abutments individually movable into and out of vertical alignment with said forked bracket, a gauge locking member rotatable about a vertical axis disposed adjacent said rack, dogs on said locking member, a forked bracket carried by the rack and adapted to register with one of said dogs in each located position of the gauge tube but to foul said dogs laterally in all other positions, a cam plate rotatable co-axially with and connected to said locking member and means for operatively connecting said cam plate with the inlet and serve valves.

5. In combination with a liquid measuring and dispensing apparatus having a measuring vessel, a conduit through which said measuring vessel is supplied with the liquid to be dispensed, a normally closed inlet valve controlling the flow of liquid through said conduit, a lever for actuating said valve, a gauge tube vertically adjustable through the bottom of said measuring vessel, a conduit to service from said measuring vessel, a self closing serve valve controlling the flow of the liquid to be dispensed through said conduit, a lever for opening said valve, a double faced cam pivotally mounted between said inlet valve and said serve valve, means for rotating said double faced cam, a push rod connecting the serve valve lever with one of said cam faces, and another push rod connecting the inlet valve lever with the other of said cam faces, said cam faces adapted to open only one of said valves at a time.

In testimony whereof I have hereunto subscribed my name this first day of June, 1927.

MALCOLM JAMES CRAWFORD.